(12) United States Patent
Gellineau et al.

(10) Patent No.: US 9,267,963 B2
(45) Date of Patent: Feb. 23, 2016

(54) INTERFEROMETRIC ATOMIC-FORCE MICROSCOPY DEVICE AND METHOD

(71) Applicant: The Board of Trustees of the Leland Stanford Junior University, Palo Alto, CA (US)

(72) Inventors: Antonio A. Gellineau, Stanford, CA (US); Olav Solgaard, Stanford, CA (US); Karthik Vijayraghavan, Mountain View, CA (US); Andrew Y J Wang, Mountain View, CA (US); Manish J. Butte, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 13/829,626

(22) Filed: Mar. 14, 2013

(65) Prior Publication Data
US 2014/0130213 A1    May 8, 2014

Related U.S. Application Data

(60) Provisional application No. 61/724,271, filed on Nov. 8, 2012.

(51) Int. Cl.
| | |
|---|---|
| *G01Q 60/38* | (2010.01) |
| *B82Y 35/00* | (2011.01) |
| *G01Q 20/02* | (2010.01) |
| *G01Q 70/10* | (2010.01) |

(52) U.S. Cl.
CPC ............. *G01Q 60/38* (2013.01); *B82Y 35/00* (2013.01); *G01Q 20/02* (2013.01); *G01Q 70/10* (2013.01)

(58) Field of Classification Search
CPC ....... G01Q 20/02; G01Q 60/24; G01Q 60/38; G01Q 70/10; B82Y 35/00
USPC ........................................................ 850/6, 33
See application file for complete search history.

(56) References Cited

U.S. PATENT DOCUMENTS

| | | | | |
|---|---|---|---|---|
| 5,079,958 | A | * | 1/1992 | Takase et al. ............ 73/862.625 |
| 5,908,981 | A | * | 6/1999 | Atalar et al. .................... 73/105 |
| 7,089,787 | B2 | | 8/2006 | Sahin et al. |
| 7,302,833 | B2 | | 12/2007 | Sahin et al. |

(Continued)

OTHER PUBLICATIONS

V. Aksyuk, et al., "A Novel Integrated Optomechanical Transducer and Its Application in Atomic Force Microscopy", "www.ntsi.org", 2013, pp. 173-176, vol. 2, Publisher: NSTI-Nanotech; ISBN 978-1-4822-0584-8, Published in: Gaithersburg, Maryland.

*Primary Examiner* — Wyatt Stoffa
(74) *Attorney, Agent, or Firm* — Kaplan Breyer Schwarz & Ottesen, LLP

(57) ABSTRACT

A high-bandwidth AFM probe having a diffraction grating characterized by a diffraction characteristic that monotonically changes along the length of the diffraction grating is disclosed. AFM probes in accordance with the present invention are capable of high-sensitivity performance over a broad range of operating conditions, such as operating wavelength and measurement media. A method for estimating at least one physical property of a surface based on high-frequency signal components in the output signal from a high-bandwidth AFM probe is also disclosed. The method enables determination of tip-surface interaction forces based on the relationship between a first motion of the base of the AFM probe and a second motion of the tip of the AFM probe.

20 Claims, 16 Drawing Sheets

View through a-a

(56) References Cited

U.S. PATENT DOCUMENTS

| | | |
|---|---|---|
| 7,404,314 B2 | 7/2008 | Sahin et al. |
| 8,082,593 B2 * | 12/2011 | Sarioglu et al. ............ 850/6 |
| 2008/0041143 A1 * | 2/2008 | Sahin et al. ............ 73/105 |
| 2009/0205091 A1 * | 8/2009 | Haaheim et al. ............ 850/33 |
| 2009/0229020 A1 * | 9/2009 | Adams et al. ............ 850/33 |
| 2010/0218288 A1 * | 8/2010 | Sarioglu et al. ............ 850/33 |
| 2010/0229264 A1 * | 9/2010 | Amro et al. ............ 850/40 |
| 2012/0297509 A1 * | 11/2012 | Mirkin et al. ............ 850/60 |

\* cited by examiner

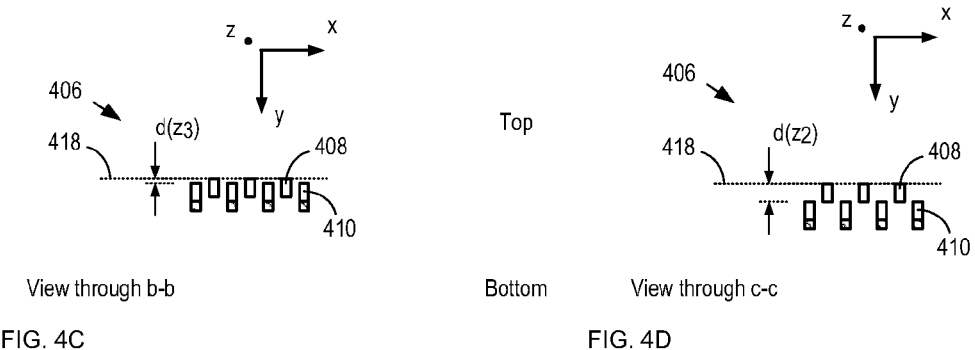
FIG. 4C — View through b-b
FIG. 4D — View through c-c

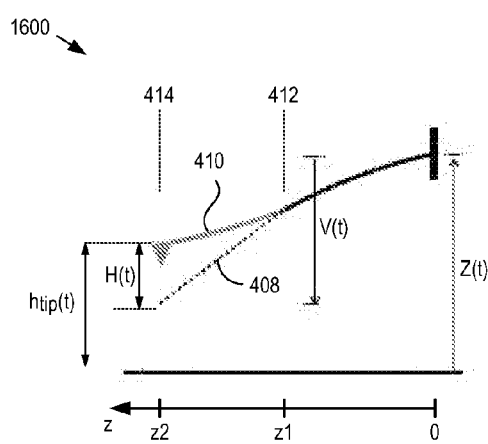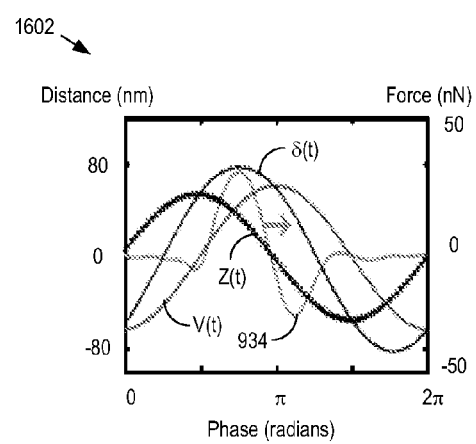
FIG. 16A
FIG. 16B

INTERFEROMETRIC ATOMIC-FORCE MICROSCOPY DEVICE AND METHOD

CROSS REFERENCE TO RELATED APPLICATIONS

This case claims the benefit of U.S. Provisional Patent Application 61/724,271, which was filed on Nov. 8, 2012, and which is incorporated herein by reference.

If there are any contradictions or inconsistencies in language between this application and one or more of the cases that have been incorporated by reference that might affect the interpretation of the claims in this case, the claims in this case should be interpreted to be consistent with the language in this case.

STATEMENT REGARDING FEDERALLY SPONSORED RESEARCH

This invention was made with Government support under Contract No. PHY-0830228 awarded by the National Science Foundation. The Government has certain rights in the invention.

FIELD OF THE INVENTION

The present invention relates to atomic-force microscopy in general, and, more particularly, to high-bandwidth tapping-mode atomic force microscopy.

BACKGROUND OF THE INVENTION

Atomic-force microscopy (AFM) is a technique for imaging a surface of a surface at the sub-nanometer (nm) scale. It has become commonly used for surface characterization, as well as mapping of certain material-specific surface properties, for materials such as polymers, ceramics, composites, glass, and biological tissue.

An AFM probe typically includes a very sharp tip that is mounted at the end of a cantilever. To image a surface, the tip is moved along the surface and its interaction with the surface is recorded. When the tip is in proximity with the surface, forces between the tip and the sample lead to a deflection of the cantilever, which can be measured with very high accuracy. By scanning the probe tip in two dimensions, a complete map of the surface structure and/or other physical properties of the surface can be developed.

Tapping-mode AFM (TM-AFM) is a particular type of AFM wherein the probe tip is brought into intermittent-contact with the surface so that it intermittently touches or "taps" the surface. TM-AFM is particularly attractive for measuring soft materials, since the tip is less likely to be "stuck" in the material. In addition, lateral forces on the tip, such as drag (which can reduce measurement accuracy), are virtually eliminated.

In TM-AFM, an actuator drives the cantilever such that it oscillates at its fundamental resonance frequency while the probe tip is scanned over the sample surface. The separation between the probe tip and the sample surface is adjusted via a feedback control loop to maintain constant oscillation amplitude at the probe tip. As the tip intermittently touches the sample during a scan, the tip experiences a contact force that induces dynamic effects on the mechanical behavior of the probe, such as oscillation amplitude changes, phase changes, and the develop of harmonic components. These effects occur at frequencies much higher than the fundamental frequency of the probe and contain information about the physical properties of the surface over which the probe tip is scanned. Unfortunately, conventional AFM probes lack the capability to measure the higher signal frequency components with sufficient fidelity.

To overcome the drawbacks of conventional AFM probes, AFM probes having higher bandwidth capability were developed to enable direct measurement (typically via optical means) of the higher frequency components of the tip-sample interactions while preserving conventional operation in tapping mode. Examples of high-bandwidth AFM probes are disclosed in U.S. Pat. No. 8,082,593, which is incorporated herein by reference.

A typical high-bandwidth AFM probe has a cantilever body that extends from a reference structure to a first end, from which a sensor cantilevers to a second end that includes the probe tip. The sensor is characterized by higher resonance frequency than the cantilever portion; therefore, the sensor can respond to the dynamic effects that arise from tip-surface interactions. The mechanical behavior of the sensor versus that of the cantilever body is monitored, providing a signal that can be processed to yield more information about the properties of the surface than can be obtained with simpler cantilever-type probes.

The performance of these high-bandwidth AFM probes is limited by their design, however. Sufficient measurement sensitivity and signal-to-noise ratio (SNR) can only be achieved when the probes are operated within a narrow range of operation conditions, such as a specific, narrow range of wavelengths and incidence angle for the optical signal used for their interrogation. Further, these sensors can only be operated in a medium having a refractive index that is within a very narrow range.

Improved AFM systems, probes, and methods that increase the range of operating conditions in which AFM microscopy can be performed would represent a significant advance in the state of the art.

SUMMARY OF THE INVENTION

The present invention enables measurement of a surface with high sensitivity over a broad range of operating conditions. AFM probes in accordance with the present invention are particularly well suited for use in measuring biological samples, operation in environments characterized by high mechanical damping, and in disparate AFM systems having different optical characteristics.

An illustrative embodiment of the present invention comprises an optically interrogated high-bandwidth AFM probe having a cantilever body having a first resonance frequency, a sensor having a second resonance frequency that is higher than the first resonance frequency, and a tip disposed at the end of the AFM probe. The cantilever body extends from a base to a first end, from which the sensor cantilevers to a second end where it is mechanically coupled with the tip. The sensor comprises a diffraction grating whose diffraction characteristics change monotonically from the first end to the second end.

In operation, the AFM probe is driven into oscillation at the first frequency and scanned over a sample surface by a scanner actuator so that the tip periodically interacts with the surface. A first light signal is directed onto the diffraction grating and the resultant diffraction pattern is used to generate signals based on the deflection of the cantilever and the tip-surface interaction force. The location at which the first light signal is incident on the diffraction grating can be selected to substantially optimize measurement sensitivity based on the operating conditions for the AFM system, such as wavelength of the first light signal, incidence angle of the first light signal on the diffraction grating, and refractive index of the media in which the measurement is being made. As a result, the AFM probe is capable of high-sensitivity operation over a wide range of operating conditions or in any of a range of AFM systems.

In some embodiments, the diffraction grating comprises a plurality of reference elements that are interleaved with a plurality of sample elements to collectively define the diffraction grating. Each of the reference elements and sample elements is characterized by the second resonance frequency. The reference elements are flat and coplanar in a first plane. The sample elements, however, include a bias layer of high tensile stress material disposed on their bottom surface. The high stress of the bias layer induces the sample elements to bend downward out of the first plane such that their separation distance from the first plane increases monotonically along their length. As a result, the spatial relationship between the reference elements and the sample elements changes monotonically along their lengths as well, giving rise to the variation in diffraction conditions along their length.

In some embodiments, the thickness of one of the reference elements is tuned to compensate for the fact that they have slightly shorter length than the sample elements, which extend further to enable their mechanical coupling with the tip at the second end.

An embodiment of the present invention is a method wherein signals based on the deflection of the cantilever and the tip-surface interaction force are generated. The two signals are then sampled and converted to frequency domain. Because the interaction time between the tip and surface is much shorter than an oscillation period, the tip-surface interaction force gives rise to harmonics that are based on the physical properties of the surface. These signals are filtered with a low-pass filter to eliminate high frequency noise and then filtered by a high-pass filter to remove low-frequency baseline signal components induced by the scanner actuator. A sinusoid fit is used to determine the tip-surface interaction force. In addition, the relative deflections of the cantilever base, cantilever end, and tip are used to determine cantilever deflection during each oscillation period and indentation depth of the tip into the surface. From these data, a force versus indentation curve is generated and analyzed to yield physical properties of the surface, such as Young's modulus, peak repulsive force, peak adhesive force, and the like.

In some embodiments, phase information about the motion of the cantilever base and the tip is used to calculate indentation depth.

An embodiment of the present invention comprises An atomic-force microscope system for estimating a physical property of a surface, the atomic-force microscope system including a high-bandwidth AFM probe comprising: a cantilever body that is characterized by a first resonance frequency; a sensor having a first end and a second end, the sensor and the cantilever being attached at the first end, wherein the sensor includes a diffraction grating whose quiescent diffraction characteristics change monotonically from the first end to the second end, and wherein the sensor is characterized by a second resonance frequency that his higher than the first resonance frequency; and a tip, the tip and the sensor being mechanically coupled at the second end.

BRIEF DESCRIPTION OF THE DRAWINGS

FIGS. 4C-D depict schematic drawings of sectional views of grating 406 taken through lines b-b and c-c of FIG. 4A, respectively.

FIG. 16A depicts a model of cantilever deflection versus distance along the z-direction.

FIG. 16B depicts a plot of force versus indentation for one oscillation cycle of a probe in accordance with the illustrative embodiment of the present invention.

DETAILED DESCRIPTION

Tapping-Mode Atomic-Force Microscopy

As discussed above, in TM-AFM, an actuator drives a cantilever-based probe such that the cantilever oscillates at its fundamental resonance frequency while the probe tip is scanned over the sample surface. The intermittent contact between the tip and the surface gives rise to forces that introduce changes in the motion of the tip (e.g., changes in oscillation amplitude or phase, development of harmonics, etc.).

These effects occur at frequencies higher than the fundamental frequency of the cantilever structure of early probes, however. To enable their capture and thereby improve AFM measurement capability, high-bandwidth AFM probes were developed.

Figure 1A:
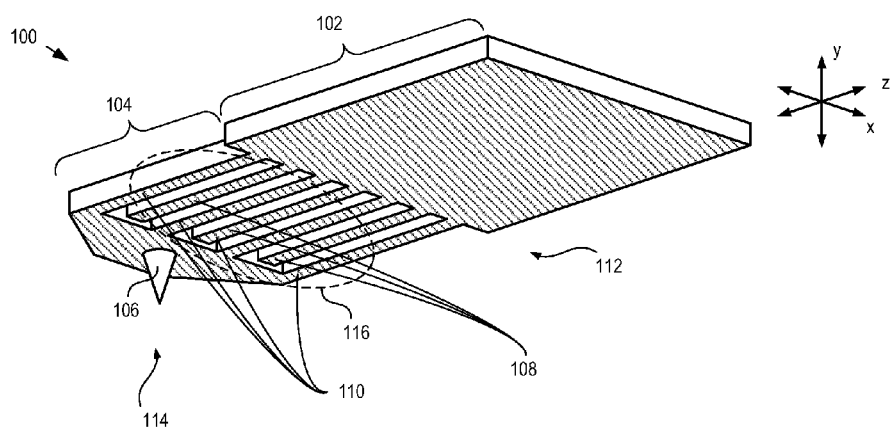
FIG. 1A depicts a schematic drawing of a perspective view of the bottom a high-bandwidth AFM probe in accordance with the prior art.

FIG. 1A depicts a schematic drawing of a perspective view of the bottom a high-bandwidth AFM probe in accordance with the prior art. Probe 100 comprises cantilever body 102, sensor 104, and tip 106. Probe 100 is representative of AFM probes disclosed in U.S. Pat. No. 8,082,592.

Cantilever body 102 is a cantilever structure having a first fundamental resonance frequency in the y-direction.

Sensor 104 comprises diffraction grating 118, which is defined by reference elements 108 and sensor elements 110. Each of reference elements 108 and sensor elements 110 cantilevers from first end 112 to second end 114, from which tip 106 depends. Each of reference elements 108 and sensor elements 110 has a second fundamental resonance frequency in the y-direction.

Each of reference elements 108 is attached to cantilever body 102 at first end 112 but is not attached to second end 114. As a result, when cantilever body 102 is oscillated at its first fundamental resonance frequency (in air), reference elements 108 substantially follow its motion.

Each of sample elements 110 is also attached to cantilever body 102 at first end 112; however, they are also connected to each other at second end 114. As a result, they are mechanically coupled to tip 106.

When probe 102 is in its quiescent state (i.e., in its stationary, steady-state configuration without applied excitation), reference elements 108 and sensor elements 110 are flat and coplanar. Diffraction grating 116, therefore, has a substantially uniform diffraction response along the z-direction.

In operation, a portion of diffraction grating 116 is illuminated by a light signal whose wavelength is selected based on the diffraction grating design. Sensor 104 diffracts the light signal such that its optical power is distributed among a plurality of diffraction orders based on the wavelength of the light signal, the width of the grating elements, and the relative spacing between sample elements and reference elements. When probe 100 is in its quiescent state, this relative spacing is limited to the lateral distance between the grating elements. It should be noted that the diffraction characteristics of diffraction grating are uniform across its entire area when it is in its quiescent position (assuming the entire incident light signal falls within the grating perimeter), which affords large alignment tolerances for the optical alignment of probe 100 within an AFM system.

Figure 1B:
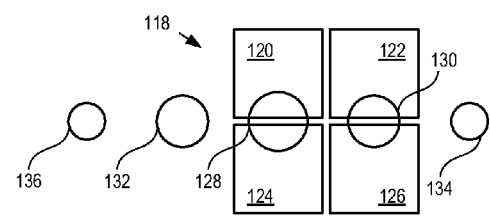
FIG. 1B depicts a schematic drawing of a diffraction pattern from probe 100, as typically received at a detector.

FIG. 1B depicts a schematic drawing of a diffraction pattern from probe 100, as typically received at a detector.

Detector 118 is a four-quadrant detector comprising photodiodes 120, 122, 124, and 126.

Spots 128, 130, 132, 134, and 136 are the projections of the $0^{th}$ diffraction order, $+1^{st}$ diffraction order, $-1^{st}$ diffraction order, $+2^{nd}$ diffraction order, and $-2^{nd}$ diffraction order, respectively, at detector 118.

The incident light signal, probe 100, and detector 118 are aligned such that the spot 128 is equally incident on photodiodes 120 and 124 and spot 130 is equally incident on photodiodes 122 and 126. Detection of the remaining diffraction orders is not typically required; therefore, spots 132, 134, and 136 are not incident on detector 118.

Due to its lower fundamental resonance frequency, cantilever body 102 does not respond strongly to the forces imparted on tip 106 during its intermittent interactions with the surface. Since reference elements 108 are not directly connected with second end 114, they closely follow the movement of cantilever body and, thus, are also relatively unaffected by tip-surface interactions. During a scan of the surface, therefore, reference elements 108 continue to oscillate at the first fundamental resonance frequency.

Sensor elements 110, however, are mechanically coupled with tip 106 at second end 114. As a result, they respond to high-frequency components of the tip-surface interactions. These high-frequency components manifest as displacement of the sensor elements in the vertical direction (i.e., y-direction), which changes the relative spacing between sample elements 108 and reference elements 110 and, in turn, the diffraction characteristics of diffraction grating 116. High-frequency components of the tip-surface interactions, as manifested in the relative motion of reference elements 108 and sensor elements 110, are detected by monitoring the distribution of optical power in spots 128 and 130 and their positions on photodiodes 120-126.

Prior-art methods for estimating the forces imparted on tip 106 include processing the output signals from photodiodes 120-126 using inverse filtering (based on models of probe 100 developed via calibration) and non-linear least-square fitting methods. These methods enable an estimation of the force acting on the tip as it interacts with the surface. This force manifests as a variation in the optical power contained in each harmonic of the oscillation frequency induced in the frequency spectrum of the probe response, which provides an indication of some of the physical properties of the surface scanned.

One skilled in the art will recognize that the measurement sensitivity of an AFM measurement of a surface using high-bandwidth probes, such as probe 100, is dependent upon several factors: (1) the wavelength of light used to interrogate the probe; (2) the physical dimensions of reference elements 108 and sample elements 110, which are dependent upon the fabrication tolerances with which they are formed; (2) the refractive index of the medium in which the sample surface is measured; and (4) the angle at which the interrogating light signal is incident on diffraction grating 116. As a result, AFM probes such as probe 100 provide optimal measurement sensitivity and signal-to-noise ratio within only a narrow range of operating conditions.

Not all AFM systems operate at the same wavelength, however. Nor do they all optically interrogate their AFM probe with a light beam that is incident at the same angle. Probe 100, therefore, must be designed and fabricated for use in a specific AFM system.

In addition, slight deviations in probe dimensions are common, due to variations inherent to batch fabrication. As a result, the performance and sensitivity of AFM probes of the same design will vary from device to device.

Further, prior-art AFM systems are often limited to operating in a specific medium—typically air. It can be desirable, however, to measure the properties of a surface while it is in a different medium, such as water, oil, biological fluid, etc.

It is an aspect of the present invention that AFM systems in accordance with the present invention can operate with high sensitivity over a broader range of operating conditions in comparison to prior-art AFM systems. For example, embodiments of the present invention include a high-bandwidth probe that is suitable for use in different AFM systems, even though those systems interrogate their AFM probe with light beams at different wavelengths and/or incidence angles. In addition, AFM systems in accordance with the present invention can be used to measure a sample surface in different media, even though these media have different refractive indices. In some embodiments, the present invention enables a batch-fabricated, generic probe that is suitable for a wide range of operating conditions and AFM systems.

Figure 2:
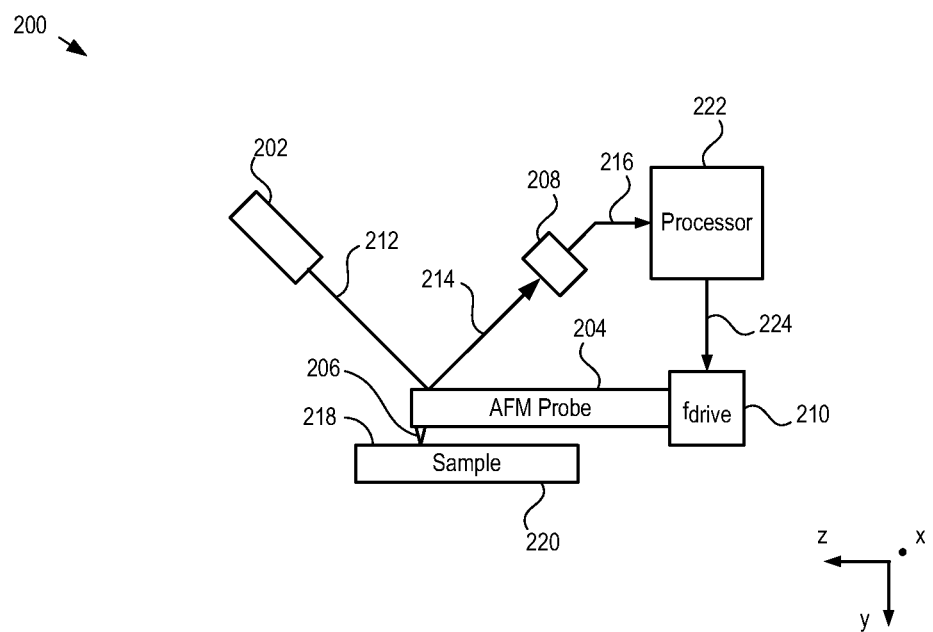
FIG. 2 depicts a schematic diagram of a portion of an AFM system in accordance with an illustrative embodiment of the present invention.

FIG. 2 depicts a schematic diagram of a portion of an AFM system in accordance with an illustrative embodiment of the present invention. System 200 comprises light source 202, probe 204, detector 208, actuator 210, and processor 222.

Figure 3:
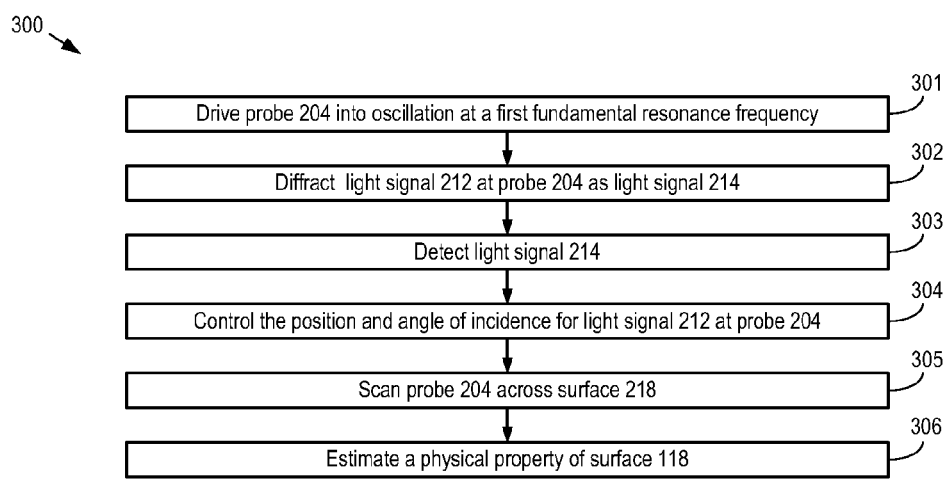
FIG. 3 depicts operations of a method for measuring a physical property of a sample surface in accordance with the illustrative embodiment of the present invention.

FIG. 3 depicts operations of a method for measuring a physical property of a sample surface in accordance with the illustrative embodiment of the present invention. Method 300 begins with operation 301, wherein probe 204 is driven into oscillation at its fundamental resonance frequency.

Actuator 210 is a conventional actuator, such as a piezoelectric resonator, that is suitable for oscillating probe 204 in the y-direction. Actuator 210 drives probe 204 with frequency $f_{drive}$, which is at or near the fundamental resonance frequency of the probe in response to control signal 224 from processor 222. In response, probe 204 oscillates at its fundamental resonance frequency along the y-direction.

Processor 222 is a conventional processor operative for running computer programs, executing instructions, providing control signals to actuator 210, receiving electrical signals from detector 208, and determining physical properties of a surface based on the electrical signals received from detector 208, among other capabilities.

At operation 302, light signal 212 is diffracted by probe 204 as light signal 214.

Light signal 212 is a collimated beam having a wavelength of approximately 690 nanometers (nm). In some embodiments, light signal is characterized by a different wavelength. Light signal 212 is provided by light source 202, which comprises a conventional laser and collimating optics. In some embodiments, light signal 212 is provided by a light source other than a laser, such as a super-luminescent diode, etc.

Figure 4A:
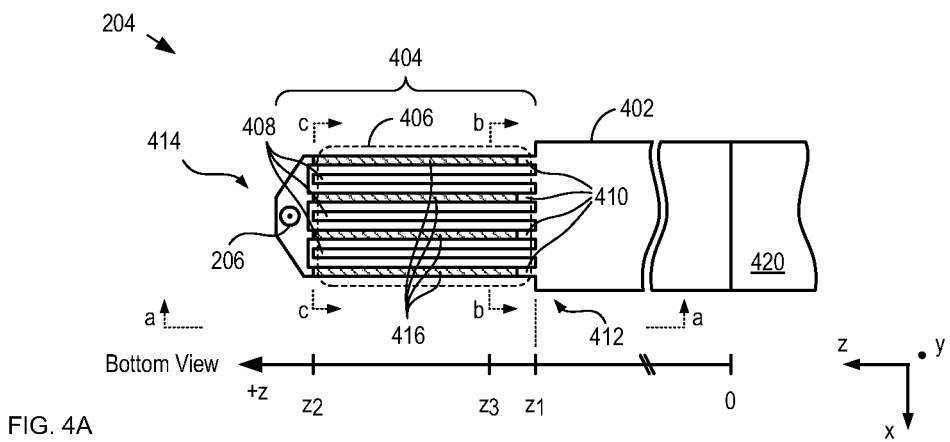
FIGS. 4A-B depict schematic drawings of bottom and side views, respectively, of a high-bandwidth AFM probe in accordance with the illustrative embodiment of the present invention.
Figure 4B:
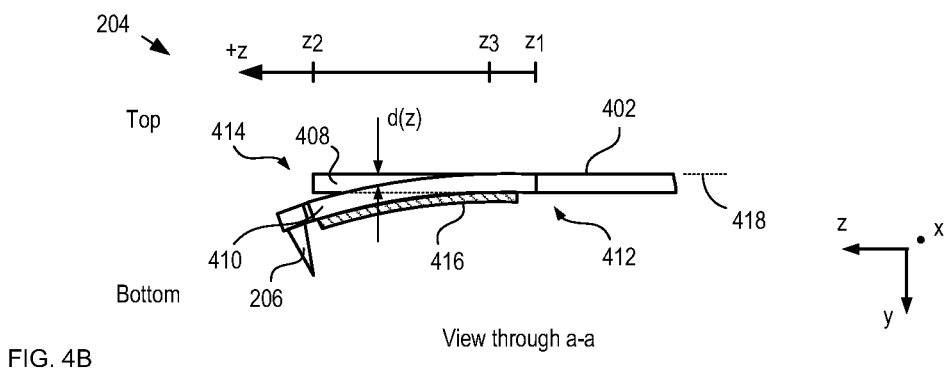

FIGS. 4A-B depict schematic drawings of bottom and side views, respectively, of a high-bandwidth AFM probe in accordance with the illustrative embodiment of the present invention. Probe 204 comprises cantilever body 402, sensor 404, and tip 206, each of which is made of single-crystal silicon. Probe 204 is a high-bandwidth AFM probe capable of measuring the high-frequency components associated with tip-surface interactions between tip 206 and surface 218. For the purposes of this Specification, including the appended claims, the term "high-bandwidth AFM probe" is defined as a probe that is designed for TM-AFM operation at drive frequency, wherein the probe is operative for measuring frequency components associated with tip-surface interactions that occur at frequencies higher than the drive frequency. In some cases, a high-bandwidth AFM probe includes a body portion, a sensor that extends from a first end of the cantilever body to a second end, and a tip located at the second end, wherein the sensor has a higher fundamental resonance frequency than the body portion such that the second end reacts more readily to a force exerted on the tip than the first end. Examples of high-bandwidth AMF probes are found in U.S. Pat. Nos. 8,082,593, 7,302,833, 7,404,314, and 7,089,787, each of which is incorporated herein by reference.

Cantilever body 402 has a length that is approximately 240 microns, a width that is approximately 57 microns, and a thickness that is approximately 2.4 microns. As a result, cantilever body 402 has a fundamental resonance frequency of approximately 20 kHz and a spring constant of approximately 0.5 N/m. Cantilever body 402 extends from base 420 (i.e., z=0) to first end 412 (i.e., z=z1).

Sensor 404 comprises a plurality of reference elements 408 and a plurality of sample elements 410, wherein the two pluralities of elements are interleaved to collectively define diffraction grating 406. Sensor 404 extends along the positive z-direction, from first end 412 (i.e., z=z1), to second end 414 (i.e., z=z2).

Reference elements 408 extend as cantilevers from first end 412 of cantilever body 402. Each of reference elements 408 is a beam of single-crystal silicon having a length that is approximately 57 microns long, a width that is approximately 4 microns, and a thickness that is approximately 2.4 microns. As a result, each of reference elements 408 has a fundamental resonance frequency of approximately 550 kHz and a spring constant of approximately 22.5 N/m. Reference elements 408 are formed such that they are substantially flat and their top surfaces are coplanar and lie in x-z plane 418.

In similar fashion, sample elements 410 also extend as cantilevers from first end 412 of cantilever body 402 but are joined together at second end 414. Each of sample elements 410 is a beam of single-crystal silicon having a length that is approximately 58 microns long, a width that is approximately 4 microns, and a thickness that is approximately 2.4 microns. As a result, each of sample elements 410 also has a fundamental resonance frequency of approximately 550 kHz and a spring constant of approximately 22.5 N/m. The spacing between interleaved reference elements 408 and sample elements 410 is approximately 4 microns; therefore, diffraction grating 406 has a periodicity that is approximately 6 microns.

Each of sample elements 410 also includes a bias layer 416, which is disposed on its bottom surface. Each of bias layers 416 is a layer of silicon nitride having a thickness of approximately 25 nm and a residual tensile stress of approximately 1 GPa. The high residual tensile stress of bias layers 416 induces bending of each sample element in the negative y-direction along its length (i.e., in the z-direction) from first end 412 to second end 414, as depicted in FIG. 4B.

Tip 206 is a substantially circular pyramid of single crystal silicon having a base diameter of approximately 9 microns and a height of approximately 4.5 microns. Tip 206 depends from second end 414.

In some embodiments, a different high-tensile-stress material is disposed on the bottom surface of each of sample elements 410. In some embodiments, a high-compressive stress material is disposed on the top surface of each of sample elements 410 to induce downward bending of the elements. In some embodiments, bias layer 416 is disposed on the top or bottom surfaces of reference elements 408, rather than sample elements 410. Materials suitable for use in bias layer 416 include, without limitation, silicon, silicon nitrides, silicon oxynitride, silicon germanium, silicon carbide, silicon oxides, low-temperature oxide, sputtered metals, evaporated metals, metal alloys, and the like.

One skilled in the art will recognize that, due to their length difference, reference elements 408 and sample elements 410 will have slightly different fundamental resonance frequencies. In some embodiments, therefore, the resonance frequencies of reference elements 408 and sample elements 410 are substantially equalized by:

i. thinning reference elements 408 slightly to reduce their resonance frequency to that of sample elements 410; or ii. adding material to sample elements 410 to increase their thickness such that their resonance frequency is increased to that of reference elements 408; or iii. adding or removing material only along a portion of reference elements 408 or sample elements 410, such as their free ends; or iv. altering the geometry of one of reference elements 408 and sample elements 410 to provide them with a different cross-sectional shape, a non-uniform cross-sectional shape along their length, or tapering their cross-section along their length; or v. any combination of i, ii, iii, and iv.

It should be noted that the materials, dimensions, and resonance frequencies provided for probe 204 are merely exemplary and alternative embodiments of the present invention can include AFM probes comprising any suitable materials and having any practical dimensions, resonance frequencies, and spring constants that are suitable for the application for which they are intended without departing from the scope of the present invention. Materials suitable for use in probe 204 include, without limitation, compound semiconductors, silicon germanium, silicon carbide, polysilicon, ceramics, dielectric materials, and the like. In some exemplary embodiments, cantilever body 402 can have a length within the range of approximately 100 microns to 500 microns, a width within the range of approximately 10 microns to approximately 70 microns, and a thickness within the range of approximately 100 nm to approximately 6 microns. Exemplary dimensions for reference elements 408 and sample elements 410 include lengths within the range of approximately 20 microns to approximately 100 microns, widths within the range of approximately 1 micron to approximately 10 microns, and thickness within the range of approximately 100 nm to approximately 6 microns.

FIGS. 4C-D depict schematic drawings of sectional views of grating 406 taken through lines b-b and c-c of FIG. 4A, respectively. Probe 204 is depicted in its quiescent state (i.e., in its stationary, steady-state configuration without excitation by actuator 210).

When probe 204 is in its quiescent state, sample elements 410 lie below plane 418 (i.e., reference elements 408) by an amount that is a function of distance along the z-direction from first end 412. For example, at z=z3, the separation distance between the top surfaces of reference elements 408 and the top surfaces of sample elements 410 is d(z3), while at z=z2, the separation distance between these top surfaces is d(z2). Since z3 is very near the anchor point of the elements at z=0, the magnitude of d(z3) is very small. The magnitude of d(z) increases monotonically from first end 412 to second end 414; therefore, the quiescent diffraction characteristics of diffraction grating 406 change monotonically along this length as well. Since z2 is at second end 414, d(z2) is much larger than d(z3). Although probe 204 can be designed with a quiescent value of d(z2) of any practical value, in the illustrative embodiment, the quiescent value of d(z2) for the illustrative embodiment is 170 nm. One skilled in the art will recognize that the difference between d(z3) and d(z2) is dependent upon the materials of sample elements 410 and bias layers 416, their respective residual stresses, and the specific geometry of reference elements 408 and sample elements 410.

Figure 5:
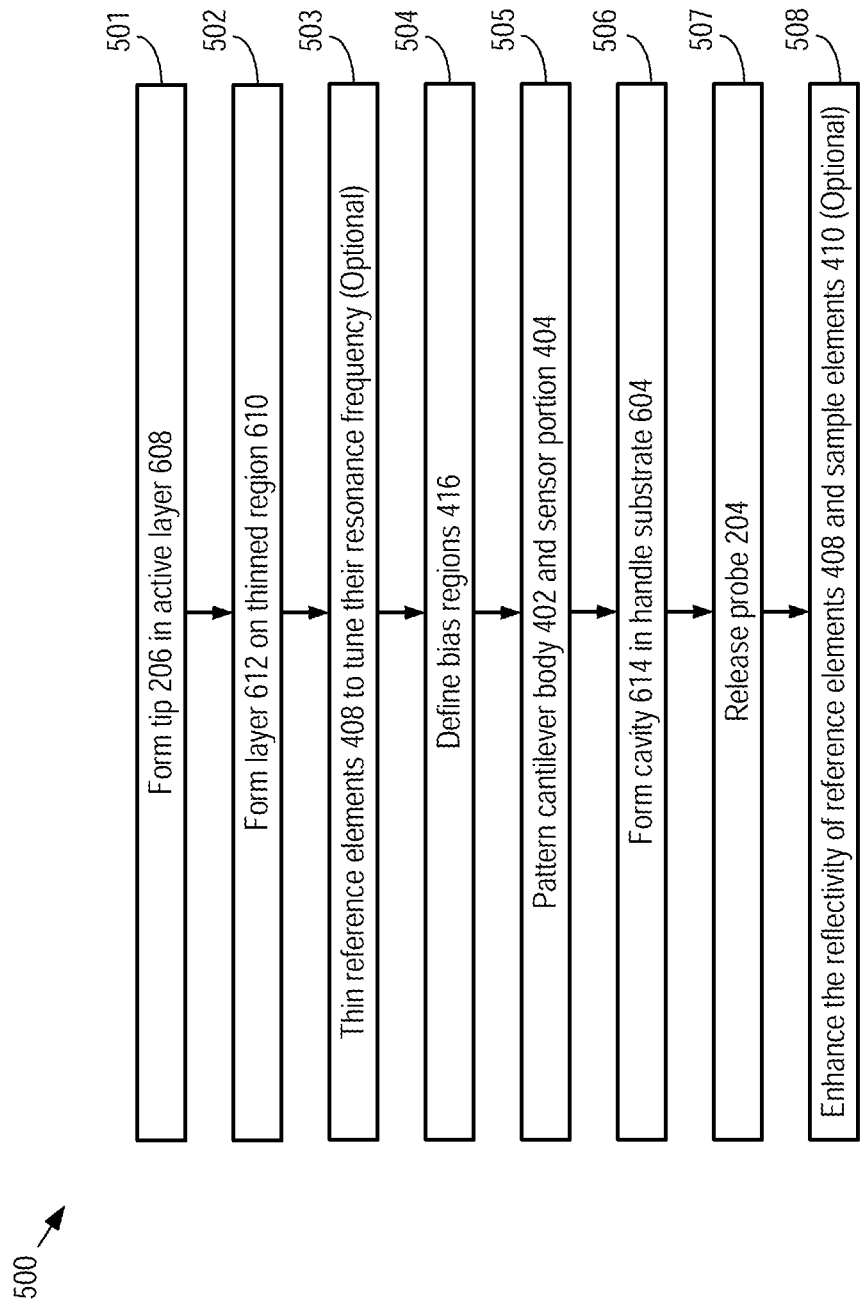
FIG. 5 depicts operations of a method suitable for fabricating a high-bandwidth probe in accordance with the illustrative embodiment of the present invention.

FIG. 5 depicts operations of a method suitable for fabricating a high-bandwidth probe in accordance with the illustrative embodiment of the present invention. Method 500 begins with operation 501, wherein tip 206 is formed. Method 500 is described with reference to FIGS. 6A-F, which depict probe 204 at different stages of its fabrication.

Formation of tip 206 begins with definition of a mask layer on substrate 602. The mask layer is defined as a square having sides of approximately 9 microns, which are substantially aligned with <110> crystal planes in active layer 608.

Substrate 602 is a conventional silicon-on-insulator (SOI) wafer. Substrate 602 includes handle substrate 604, buried oxide layer 606, and active layer 608. Handle substrate 604 is a conventional single-crystal silicon substrate, buried oxide layer 606 is a conventional silicon dioxide layer having a thickness of approximately 1 micron, and active layer 608 is a layer of single-crystal silicon having a thickness of approximately 6.85 microns. It will be clear to one skilled in the art, after reading this Specification, how to specify, make, and use probes formed from substrates comprising different materials and/or different layer thicknesses.

After definition of the mask layer, active layer 608 is etched in a crystallographic-dependent etch having an etch rate for the <100> planes of single-crystal silicon that is much greater than its etch rate for the <111> planes. Suitable crystallographic-dependent etches include, without limitation, potassium hydroxide (KOH), ethylene diamine pyrocatechol (EDP), hydrazine, and the like. This creates nascent tip 206 and thinned region 610, from which cantilever body 402 and sample region 404 will be subsequently formed. After etching of active layer 608, tip 206 has a height of approximately 4.5 microns and thinned region 610 has a thickness of approximately 2.3 microns.

After its formation, nascent tip 206 is further sharpened by oxidation, which is followed by removal of both this oxide and the mask layer.

Figure 6A:
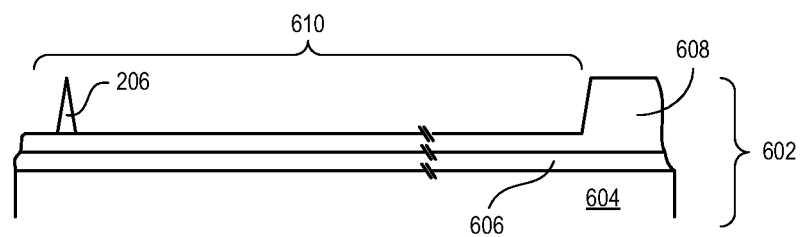
FIGS. 6A-D depict probe 204 at different stages of its fabrication.

FIG. 6A depicts a schematic drawing of a side view of substrate 602 after formation of tip 206.

At operation 502, layer 612 is deposited on the top surface of substrate 602 via low-pressure chemical-vapor deposition (LPCVD).

Layer 612 is a layer of stoichiometric silicon nitride having a thickness sufficient to yield a final thickness of 20 nm after the fabrication of probe 204 is complete (accounting for slight thinning that can occur during subsequent processing steps). Layer 612 is characterized by a residual tensile stress of approximately 1 GPa. The deposited thickness and stress of the silicon nitride layer are selected based on the amount of stress-induced curling of sensor elements 210 desired upon completion of probe 204.

Figure 6B:
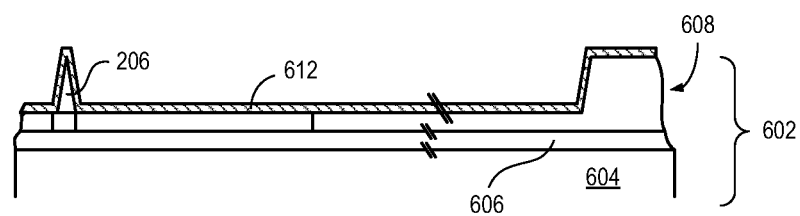

FIG. 6B depicts a schematic drawing of a side view of substrate 602 after formation of layer 612.

At optional operation 503, reference elements 408 are thinned to tune their resonance frequency to that of sample elements 410. To thin reference elements 408, layer 612 is patterned to expose only those portions of thinned region 610 that correspond to reference elements 408. These portions are then etched to a depth of 625 nm. It should be noted that this etch depth is based on the specific mechanical and resonance characteristics of reference elements 408 and sample elements 410; therefore, in some embodiments, the portions are etched to a different etch depth.

At operation 504, bias layers 416 are defined. Bias layers are defined by forming an etch mask on layer 612 to protect it in the portions of thinned region 610 that correspond to sample elements 410.

At operation 505, cantilever body 402 and sensor 404 are defined in thinned region 610. In order to define cantilever body 402 and sensor 404 an etch mask having the outline of these structures is formed on thinned region 610. This etch mask also protects bias layers 416 and tip 206. The exposed portions of thinned region 610 are then etched down to buried oxide 606. In some embodiments, connective tabs are included in the etch mask used to define cantilever body 402 and sensor 404. These connective tabs mechanically couple probe 204 to the rest of substrate 602. As a result, they facilitate wafer-level handling of a plurality of probes after they have been released from handle substrate 602, but enable the probes to be easily singulated when complete.

Figure 6C:
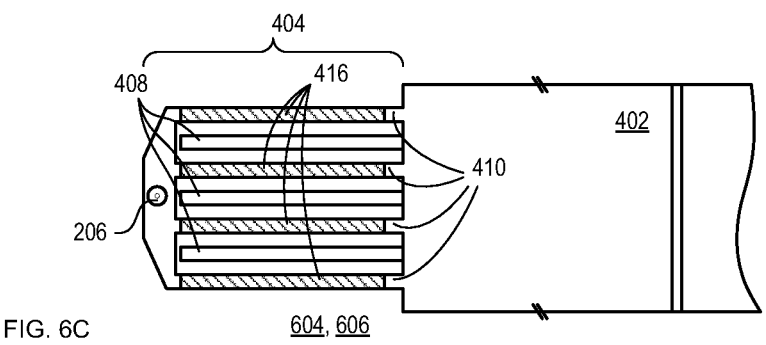

FIG. 6C depicts a schematic drawing of a top view of substrate 602 after operation 505.

At operation 506, handle substrate 602 is removed from under probe 204 to form cavity 614. Cavity 614 is formed via a deep reactive-ion etch (DRIE) from the backside of substrate 604. Cavity 615 defines the free length of cantilever body 402, as well as undercuts both cantilever body 402 and sensor 404. In order to protect probe 204 during operation 506, a layer of masking material, typically low-temperature oxide, is first deposited on the top surface of the substrate 602 (not shown).

Figure 6D:
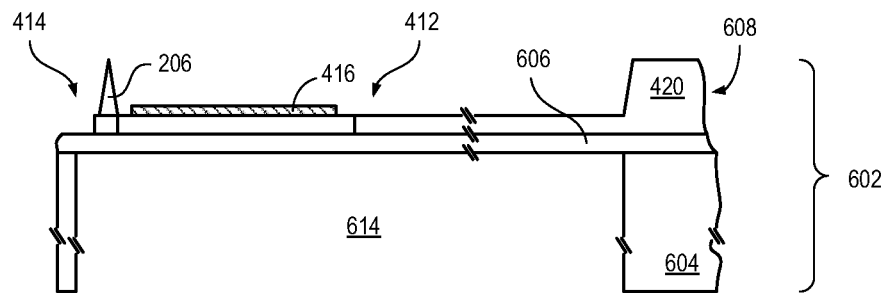

FIG. 6D depicts a schematic drawing of a side view of substrate 602 after formation of cavity 614. The free-length of cantilever body 402 extends from $y_b$ to first end 412 (y=0).

At operation 507, the top-side mask layer and the exposed buried oxide layer 606 are removed to fully release probe 204, leaving the structure shown in FIG. 4B.

One skilled in the art will recognize that method 500 is an example of a microsystems fabrication process, such as is commonly used to form Micro Electro Mechanical Systems (MEMS) devices or nanotechnology-based devices. Although in the illustrative embodiment, probe 204 is fabricated using a microsystems fabrication process, it will be clear to one skilled in the art, after reading this Specification, how to fabricate probe 204 using one or more alternative fabrication technologies, such as stamping, plating, electroforming, injection molding, and the like.

At optional operation 508, the reflectivity of reference elements 408 and sample elements 410 is enhanced. In some embodiments, the reflectivity of these elements is increased by depositing a layer of high-reflectivity material, such as a metal or dielectric layer having a thickness suitable for enhancing reflectivity, on their top surfaces. Methods for depositing an enhanced-reflectivity layer on reference elements 408 and sample elements 410 include, without limitation, sputter deposition, evaporation, chemical-vapor deposition, and the like.

Returning now to FIGS. 2-4, at operation 303, light signal 214 is detected at detector 208.

Figure 7:
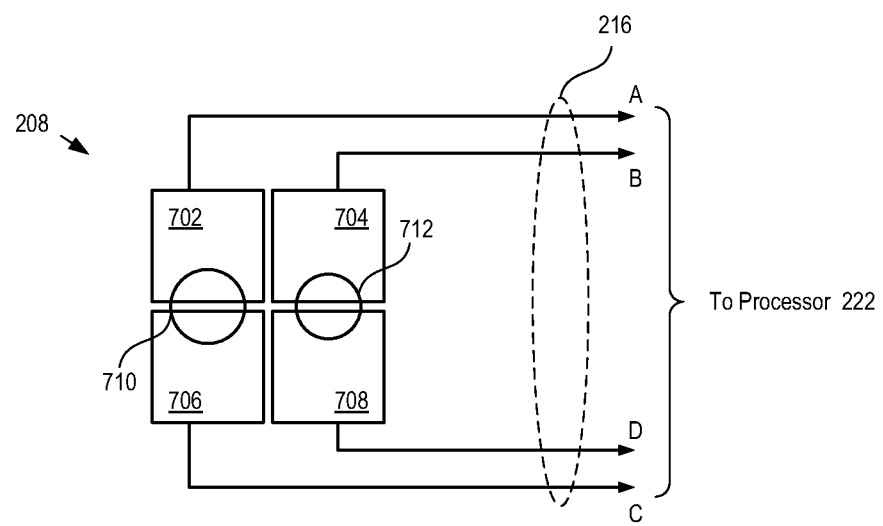
FIG. 7 depicts a schematic drawing of light signal 214, as received at detector 208.

FIG. 7 depicts a schematic drawing of light signal 214, as received at detector 208. Detector 208 is analogous to detector 118 described above and with respect to FIG. 1B.

Detector 208 is a four-quadrant photodetector comprising photodiodes 702, 704, 706, and 708. Photodiodes 702, 704, 706, and 708 provide output signals A, B, C, and D, respectively, which collectively define output signal 216. Output signals A, B, C, and D are voltage signals based on photocurrents developed in each of photodiodes 702, 704, 706, and 708 in response to the optical power incident on them.

Although the illustrative embodiment comprises a detector that is a four-quadrant photodetector, it will be clear to one skilled in the art, after reading this Specification, how to specify, make, and use alternative embodiments of the present invention wherein detector 208 comprises a different optical detection device. Detectors suitable for use in the present invention include, without limitation, focal-plane arrays (e.g., CCD camera arrays, etc.), single photodetectors, photodetector arrays, position sensitive detectors, light sensors, photodiodes, phototransistors, and the like.

Spots 710 and 712 are the projections of the $0^{th}$ diffraction order and $+1^{st}$ diffraction order in light signal 214 as received by detector 208. Spots 710 and 712 are aligned with detector 208 such that they are substantially equally distributed between photodetectors 702 and 706, while spot 712 is equally distributed between photodetectors 704 and 708. Based on this arrangement, the deflection of cantilever body 402 and reference element 408 is indicated by the combined optical power received by the photodetectors 702 and 704 (i.e., A+B) relative to the combined optical power received by photodetectors 706 and 708 (i.e., C+D). The distribution of optical power in the $0^{th}$ and $1^{st}$ orders indicates the deflection of sample elements 410 relative to reference elements 408, which is indicated by the difference between the combined optical power received by photodetectors 702 and 706 (i.e., A+C) relative to the combined optical power received by photodetectors 704 and 708 (i.e., B+D).

At operation 304, the position and angle of incidence of light signal 212 on probe 204 is established.

As discussed above and with respect to FIGS. 4A-D, the spatial relationship of sample elements 410 and reference elements 408, namely, the difference, d(z), in their position along the y-direction, changes monotonically as a function of position along the length of diffraction grating 406. As a result, the position along the z-direction at which light signal 212 hits the diffraction grating, as well as its angle of incidence, controls the distribution of optical power in the diffraction pattern in light signal 214. By controlling the position and angle of incidence at which light signal 212 strikes probe 204, therefore, the sensitivity of an AFM system employing probe 204 can be controlled (and preferably optimized), for different wavelengths of light signal 212, incidence angles of light signal 212, and/or media.

Figures 8A, 8B:
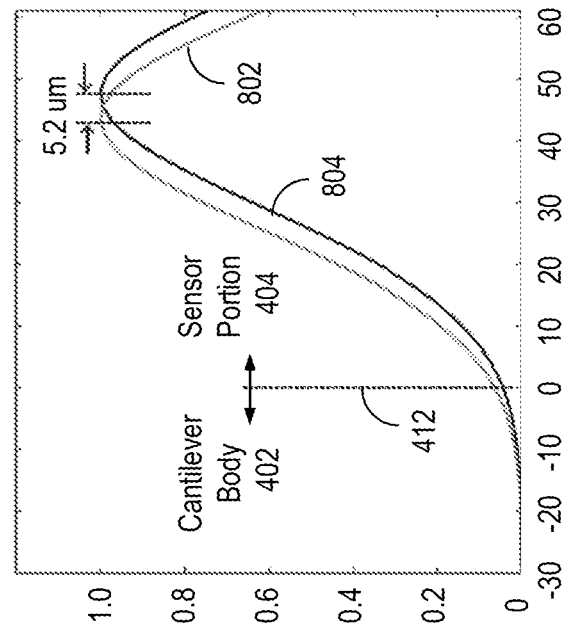
FIGS. 8A-B depict plots of modeled sensitivity versus wavelength and measurement medium, respectively, as a function of position along the length of a diffraction grating in accordance with the illustrative embodiment of the present invention.

FIGS. 8A-B depict plots of modeled sensitivity versus wavelength and measurement medium, respectively, as a function of position along the length of a diffraction grating in accordance with the illustrative embodiment of the present invention. Each of plots 800 and 806 depict model results for a diffraction grating whose reference and sample elements have a length of 61 microns, a width of 3 microns, and an element pitch of 6 microns. The quiescent deflection of the sample elements at second end 414 is selected as 170 nm. Sensitivity is defined as the power change in the $0^{th}$ and $+1^{st}$ orders of light for a unit change in displacement of second end 414, and is normalized to the maximum sensitivity for each condition.

Plot 800 depicts grating sensitivity for wavelengths of 690 nm and 860 nm (traces 802 and 804, respectively). Trace 802 shows optimal sensitivity for 690 nm light at a distance of 42 microns from first end 412, while trace 804 shows optimal sensitivity for 860 nm light at a distance of 47.2 microns from first end 412. As a result, a change in measurement wavelength of 170 nm can be compensated by increasing the distance from first end 412 at which light signal 212 is incident by approximately 5.2 microns. This corresponds to a position change of about 8.5% of the length of diffraction grating 406. Plot 800 demonstrates, therefore, that even for markedly different wavelengths, the same AFM probe in accordance with the present invention can be used with optimal sensitivity simply by changing the position along the z-direction at which light signal 212 is incident on the probe.

Plot 806 depicts models of diffraction grating sensitivity for measurements made in three different media—air, water, and glycerol (traces 802, 808, and 810, respectively), where air has a refractive index of 1.0, water has a refractive index of approximately 1.33, and glycerol has a refractive index of approximately 1.47. Each of these responses is modeled using a light signal having a wavelength of 690 nm. As shown in plot 800, trace 802 shows that optimal sensitivity for a measurement made in air is attained at a distance of 42 microns from first end 412. Trace 808 shows that optimal sensitivity for a measurement made in water is attained at a distance of 31.6 microns from first end 412, while trace 810 shows that optimal sensitivity for a measurement made in glycerol is attained at a distance of 26.4 microns from first end 412. As a result, changes in the index of refraction of the measurement media from 1.0 to 1.33 and 1.47 can be compensated by decreasing the distance from first end 412 at which light signal 212 is incident by approximately 10.4 microns and 15.6 microns, respectively. These correspond to position changes of about 17% and 25.6% of the length of diffraction grating 406, respectively. Plot 806 demonstrates, therefore, AFM measurements can made with optimal sensitivity even in different media using an AFM probe in accordance with the present invention, simply by changing the position along the z-direction at which light signal 212 is incident on the probe.

It should be noted that AFM probes in accordance with the present invention also enable compensation for a change in the angle of incidence of light signal 212. The optical path length difference between light reflected by reflected elements 408 and reference elements 410 changes as a function of the angle of incidence of light signal 212. As discussed above and with respect to FIGS. 4A-D, d(z) is a function of distance along the z-direction; therefore, compensation for a change in incidence angle can be effected by adjusting, commensurately, the position along the z-direction at which the light signal hits diffraction grating 406.

At operation 305, probe 204 is scanned across surface 218. As probe 204 is scanned along surface 218, a position controller (not shown) adjusts the separation between the probe and the surface to enable tip 206 to intermittently interact with the surface.

As probe 204 interacts with surface 218, the tip-surface interaction forces impart time-dependent periodic behavior on sample elements 410, while the motion of reference elements 408 continues to substantially follow that of cantilever body 402. As a result, the spatial relationship of the elements of diffraction grating 206 changes as a function of time thereby imparting a time-dependent periodic signal onto the distribution of optical power in the diffraction pattern of light signal 216.

At operation 306, processor 222 computes an estimate of a physical property of surface 118.

Figure 9:
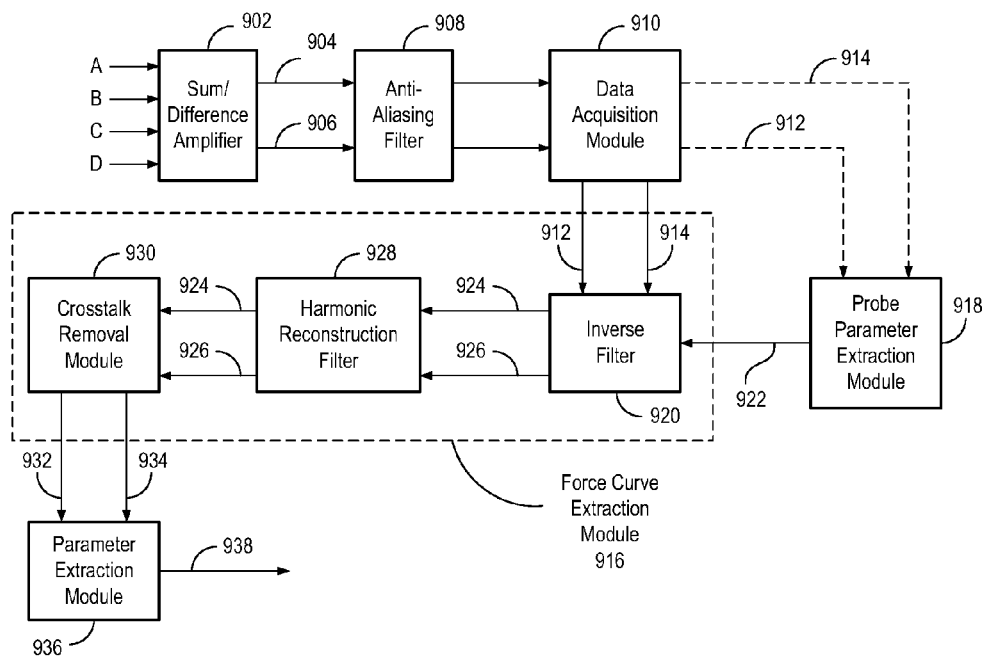
FIG. 9 depicts a flow chart for a method suitable for computing an estimate of a physical property of a surface in accordance with the illustrative embodiment of the present invention.

FIG. 9 depicts a flow chart for a method suitable for computing an estimate of a physical property of a surface in accordance with the illustrative embodiment of the present invention. Chart 900 depicts signal-processing operations that are suitable for use as sub-operations of operation 306. It should be noted, however, that the signal processing flow depicted in chart 900 is suitable for use with any high-bandwidth AFM probe-based AFM system, including probes disclosed in U.S. Pat. No. 8,082,593, and the like.

Figure 10:
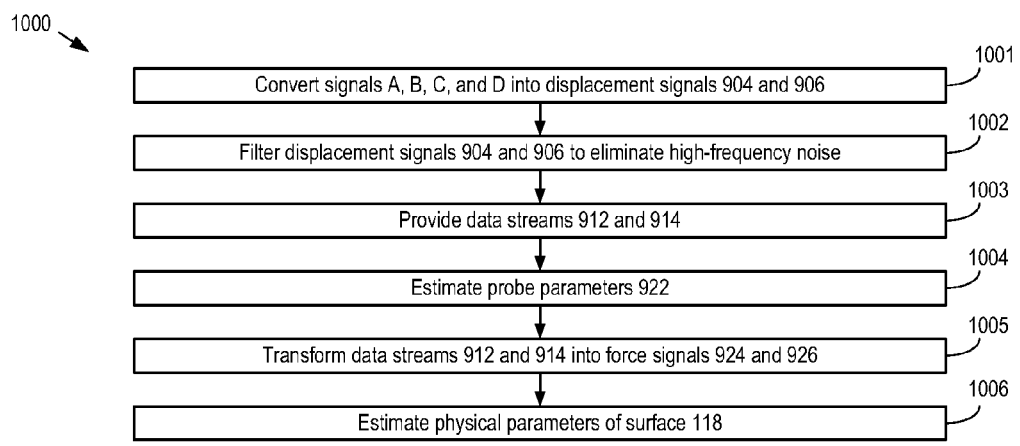
FIG. 10 depicts operations of a method for computing an estimate of a physical property of a surface in accordance with the illustrative embodiment of the present invention.

FIG. 10 depicts operations of a method for computing an estimate of a physical property of a surface in accordance with the illustrative embodiment of the present invention. Method 1000 begins with operation 1001, wherein amplifier 902 provides displacement signals 904 and 906.

Amplifier 902 is a summing/differencing amplifier that provides cantilever displacement signal 904 having a magnitude of (A+B)−(C+D) and tip displacement signal 906 having a magnitude of (A+B)−(C+D).

At operation 1002, each of displacement signals 904 and 906 is filtered by anti-aliasing filter 908 to eliminate high-frequency noise. Filter 908 is a low-pass filter having a cut-off frequency suitable for attenuating each of displacement signals 904 and 906 for frequencies equal to or greater than one-half the sampling rate of data acquisition module 910.

At operation 1003, data acquisition module 910 produces data streams 912 and 914 by sampling each of displacement signals 904 and 906, respectively, at a rate that is at least twice the highest frequency of interest in the signals (i.e., the Nyquist rate). It should be noted that sampling frequencies greater that twice the highest frequency of interest in the signals can be used; however, the cut-off frequency of filter 908 must also be selected accordingly. Data streams 912 and 914 are provided to each of probe extraction module 918 and inverse filter 920.

At operation 1004, probe extraction module 918 converts each of data streams 912 and 914 from time domain to frequency domain using a fast Fourier transform. The frequency spectra of the frequency-domain signals are then fitted with harmonic oscillators to estimate: the resonance frequency, $f_c$, spring constant, $k_c$, and quality factor, $Q_c$, of cantilever body 402; the resonance frequency, $f_r$, spring constant, $k_r$, and quality factor, $Q_r$, of reference elements 408; and the resonance frequency, $f_s$, spring constant, $k_s$, and quality factor, $Q_s$, of sample elements 410. In some embodiments, probe parameter extraction is performed in a calibration step that occurs outside the operational flow of method 1000.

At operation 1005, force extraction module 916 transforms data streams 912 and 914 into force signals 932 and 934. Force extraction module 916 comprises probe parameter extraction module 918, inverse filter 920, and harmonic reconstruction filter 928.

Figure 11:
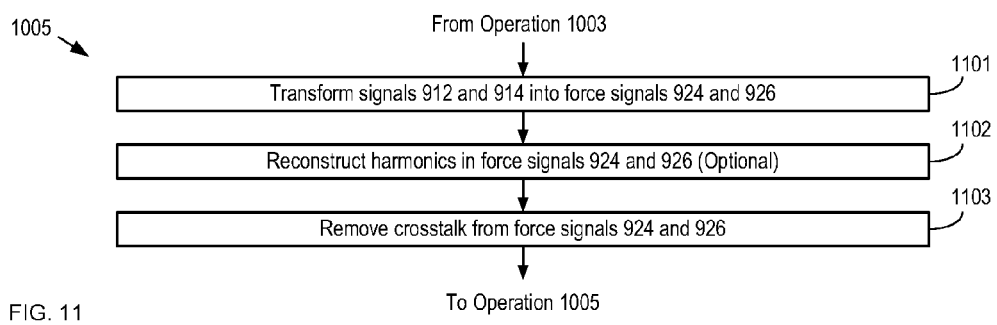
FIG. 11 depicts sub-operations of a sub-method suitable for performing operation 1004 in accordance with the illustrative embodiment of the present invention.

FIG. 11 depicts sub-operations of a sub-method suitable for performing operation 1004 in accordance with the illustrative embodiment of the present invention. Sub-method 1100 begins with sub-operation 1101, wherein probe extraction module 918 extracts mechanical parameters 922 for probe 204.

In the frequency domain, the tip-sample interaction force, $F_s(\omega)$, is given by:

$$F_s(\omega) = k_s H_s^{-1}(\omega) D_{sr}(\omega), \qquad (1)$$

where $F_s(\omega)$ and $D_{sr}(\omega)$ are the Fourier transforms of the tip-surface interaction force $f_s(t)$, and the relative displacement between sample elements 410 and reference elements 408 at second end 414, d(t), respectively, $k_s$ is the spring constant of sample elements 410, and $H_s(\omega)$ is the simple harmonic oscillator transfer function with a value of 1 at DC and $Q_s$ at resonance.

It should be noted that when probe 204 is in close proximity to the surface, such as during a scan, dynamic fluid effects, such as squeeze-film damping, can affect the quality factors of the oscillations of cantilever body 402 and the diffraction grating elements. As a result, probe parameter extraction is preferably based on the mechanical behavior of probe 204 while it is near surface 118.

At sub-operation 1102, inverse filter 920 transforms data streams 912 and 914 into force signals 924 and 926. Filter 920 comprises a Finite-Impulse-Response (FIR) filter, which can be used to provide an estimate of a force suitable for giving rise to the displacements in the response of probe 204. Inverse filter 920 employs a harmonic oscillator model of probe 204 and probe parameters 922 to create and store the required filter for imaging. In some embodiments, inverse filter 920 is based on the Park-McClellan Optimal Filter Design algorithm. It should be noted that the speed of an FIR filter enables its use in applications where every interaction between tip 206 and surface 118 must be examined. As a result, the use of an FIR filter enables, for example, the detection of binding events that might occur in only one out of every hundred tip-sample interactions.

At sub-operation 1103, filter 928 reconstructs harmonics due to tip-surface interactions, which are present in force signals 924 and 926. In some embodiments, filter 928 is a comb-filter that extracts phase and amplitude information about the harmonics. It should be noted that reconstruction of harmonics in force signal 924 and 926 are preferably included only in measurements of surfaces that have substantially uniform physical properties. For such surfaces, tip-surface forces repeat periodically. As a result, they give rise to strong harmonics and the remainder of the frequency spectrum in force signals 924 and 926 contains mainly noise.

It should be noted that some operations of method 1000 can be performed in any order. For example, harmonic reconstruction can be performed before inverse filtering, and so on.

At sub-operation 1104, crosstalk removal module 930 removes crosstalk between force signal 924 (which corresponds to the motion of cantilever body 402) and force signal 926 (which corresponds to motion of tip 206) and provides modified cantilever force signal 932 and modified tip-surface force signal 934. Crosstalk between signals 924 and 926 can arise from many causes, including:

i. misalignment of spots 710 and 712; or
ii. misalignment of detector 208; or
iii. rotation of detector 208; or
iv. non-linearities in amplifier 902; or
v. movement of the laser spot on the probe as the probe is operated; or
vi. any combination of i, ii, iii, iv, and v.

Bleeding of signal due to the motion of cantilever body 402 into the signal due to tip motion can corrupt signal 926, thereby complicating computation of the tip-sample interaction force.

Figure 12:
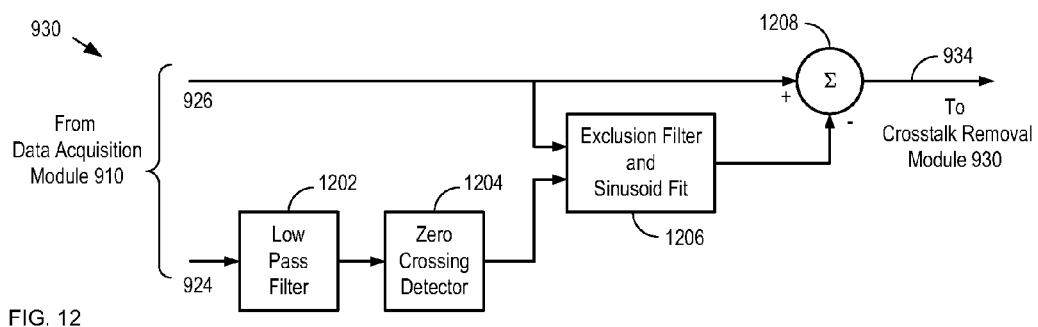
FIG. 12 depicts a flowchart for a method suitable for use in a crosstalk removal module in accordance with the illustrative embodiment of the present invention.

FIG. 12 depicts a flowchart for a method suitable for use in a crosstalk removal module in accordance with the illustrative embodiment of the present invention. Crosstalk removal from force signal 932 begins with low pass filter 1202, which filters force signal 924 to remove frequencies greater than a cut-off frequency located between the frequency of control signal 224 and twice that frequency. Force signal 924 is based on the motion of cantilever body 402, which is relatively unaffected by frequencies greater than its fundamental resonance frequency. As a result, filter 1202 removes those frequency components in force signal 924 that are likely due to crosstalk from force signal 926.

Filtered signal 924 is then passed through zero crossing detector 1204, which estimate the time points when the signal crosses zero. This information is then used to divide filtered signal 924 into individual oscillation cycle frames.

At exclusion filter 1206, a sinusoid is fit to force signal 926 (which corresponds to the tip-surface interaction force) and subtracted; however, since portions of force signal 926 contain high-frequency components that correspond to the tip-sample interaction force, those portions are excluded from the fitting. One skilled in the art will recognize that there are many ways to perform the sinusoidal fitting, such as four-parameter fitting (as embodied in IEEE standard IEEE-STD-1057), non-linear least squares fitting, and the like.

At summing node 1208, the output of exclusion filter 1206 is removed from filtered signal 926 to provide modified tip-surface force signal 934.

In some alternative embodiments of the present invention, crosstalk in force signals 924 and 926 is mitigated via independent component analysis, wherein the correlation between the two signals is reduced at a filter implemented using fast-ica software.

Figure 13:
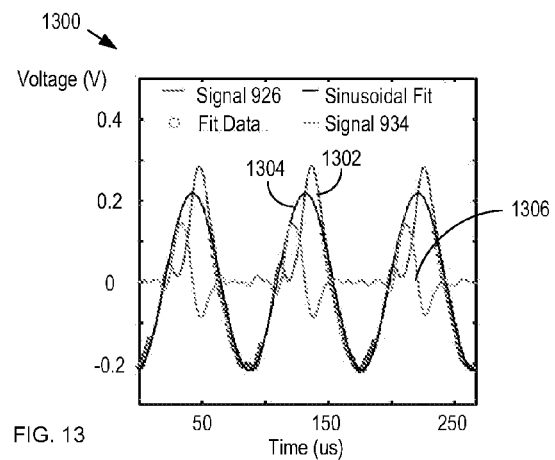
FIG. 13 depicts a plot of the output of force curve extraction module 916.

FIG. 13 depicts a plot of the output of force curve extraction module 916. In plot 1300, trace 1302 is the tip-surface interaction force signal prior to crosstalk removal (i.e., modified tip-surface force signal 934), trace 1304 represents the sinusoidal fit subtracted from signal 934, and trace 1306 is the crosstalk-free tip-surface force signal output by crosstalk removal module 930 (i.e., tip-surface force signal 934).

Figure 14:
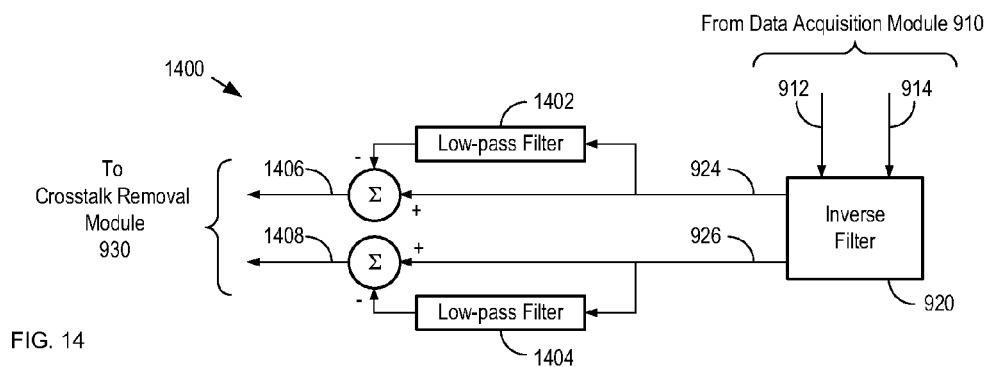
FIG. 14 depicts a portion of a force curve extraction module in accordance with a first alternative embodiment of the present invention.

FIG. 14 depicts a portion of a force curve extraction module in accordance with a first alternative embodiment of the present invention. Sub-module 1400 comprises inverse filter 920, low-pass filter 1402, low-pass filter 1404, and crosstalk removal module 930.

The desired response of each of low-pass filters 1402 and 1404 is calculated using a Park-McClellan optimal finite inverse filter design algorithm. The input parameters of the algorithm include that the gain of the filter at frequency=$f_{drive}$/4 is 1, while the gain of the filter at frequency=$f_{drive}$ is 0, where $f_{drive}$ is the frequency at which oscillator 210 is driven by processor 222.

Low-pass filter 1402 substantially passes only low-frequency background signal in force signal 924. This frequency content is then subtracted from force signal 924 at summing node 1410. As a result, force signal 1406 represents the force associated with the motion of cantilever body 402 with low-frequency background noise removed.

In similar fashion, low-pass filter 1404 substantially passes only low-frequency background signal in force signal 926. This frequency content is then subtracted from force signal 926 at summing node 1412. As a result, force signal 1408 represents the force associated with tip-surface interactions with low-frequency background noise removed.

Crosstalk in force signals 1406 and 1408 is then removed at crosstalk removal module 930 yielding force cantilever signal 932 and tip-surface signal 934, as described above.

Figure 15:
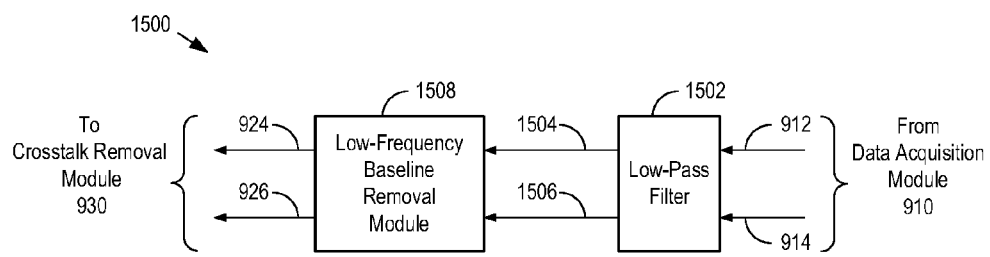
FIG. 15 depicts a portion of a force curve extraction module in accordance with a second alternative embodiment of the present invention.

FIG. 15 depicts a portion of a force curve extraction module in accordance with a second alternative embodiment of the present invention. Sub-module 1500 comprises low-pass filter 1502, baseline removal filter 1508, and crosstalk removal module 930. It should be noted that sub-module 1500 is particularly well suited for use in AFM measurements made in liquid environments, such as measurement of biological samples, etc.

Low-pass filter 1502 receives data streams 912 and 914 from data acquisition module 910 and removes high-frequency noise in the data streams thus providing filtered data streams 1504 and 1506. For AFM measurements performed in a fluid environment, the fluid acts as a significant damping mechanism for the motion of probe 204. As a result, a typical cutoff frequency for low-pass filter 1502 in such applications is approximately 150 kHz. One skilled in the art will recognize, however, that the cutoff frequency can be of any suitable value based on the measurement environment. For example, for measurements made in an air environment, the cutoff frequency of low-pass filter 1502 might be in the MHz range.

Baseline removal filter 1508 receives the filtered data streams 1504 and 1506 from low-pass filter 1502 and removes frequency components associated with driving frequency, $f_{drive}$.

Filtered data streams 924 and 926 are then provided to crosstalk removal module 930, which provides force cantilever signal 932 and tip-surface signal 934, as described above.

Returning now to method 1000, at operation 1006, tip-surface interaction force signal 934, $f_{drive}$, and the deflection signal for tip 206 are used to estimate physical parameters of surface 118.

The peak repulsive and adhesive forces can be read directly from the maximum and minimum forces included in tip-surface interaction force signal 934, which is depicted in FIG. 13.

The impulse of the tip-surface interaction force is computed by integrating tip-surface interaction force signal 934 with respect to time.

To obtain the local elastic property, such as Young's modulus, tip-surface interaction force signal 934 is represented as a function of indentation into surface 118 as opposed to a function of time. Positive values of indentation indicate that the tip has been pushed inside sample 120 while negative values indicate that the tip is away from sample 120. In other words, indentation is simply a measure of the position of the tip.

FIG. 16A depicts a model of cantilever deflection versus distance along the z-direction. Cantilever body 402 extends from base 420 to first end 412, while sensor 404 extends from first end 412 to second end 414.

The instantaneous vertical position of base 420 is defined as Z(t), while the combined vertical deflection of cantilever body 202 and sensor 204 from Z(t) to second end 414 is defined as V(t).

The indentation, $\delta(t)$, of tip 206 into surface 118 is the negative of the tip position, $h_{tip}(t)$. Indentation, $\delta(t)$, is calculated based on the fact that the signal 904 measures the deflection of cantilever body 402 (which is related to the slope at the end of the probe) and not the position of tip 206.

The position of cantilever body 402 at $y_b$ is given by:

$$Z(t)=D_0-a\sin(\omega_{dr}t+\phi), \quad (2)$$

where $D_0$ is the separation between the base of cantilever body 402 and surface 118, a is the amplitude of the drive motion, and H(t) is the relative displacement between sample elements 410 and reference elements 410, $\omega_{dr}$ is $f_{drive}$, and $\phi$ is the phase difference between the cantilever deflection and drive motions.

Further, the indentation of tip 206 into surface 118 is given by:

$$\delta(t)=-h_{tip}(t)=V(t)-H(t)-Z(t). \quad (3)$$

In air, due to high quality factors, the driving oscillation that is used to shake the base of the cantilever can be neglected. As a result, the deflection signal can be directly used to calculate the position of the tip, and hence indentation. However, in fluid, high damping causes the oscillation of the base to be comparable to the cantilever deflection and must be taken into account when calculating indentation. Further, because of the high damping associated with measurement in a fluid, the deflection oscillation does not represent the true position of tip 206. Instead, the cantilever deflection and the oscillation of the base develop a phase difference, $\phi$, between them. In order to calculate this phase difference we assume that the tip-sample interaction force and indentation are substantially at a maximum at the same instant in time $t_{max}$, which give an expression for phase, $\phi$, as:

$$\phi = \cos-1\left(-\frac{1}{a\omega_{dr}}\frac{dV}{Dt}\bigg|_{t=t_{max}}\right)-\omega_{dr}t_{max}. \quad (4)$$

Equation (4) can be used to calculate the phase difference and hence the force vs. indentation curve for the portions of the cantilever oscillation wherein tip 206 is approaching surface 118 and for when tip 206 is retracting from surface 118.

FIG. 16B depicts a plot of force versus indentation for one oscillation cycle of a probe in accordance with the illustrative embodiment of the present invention.

Plot 1602 provides the force versus indentation for the approach and retraction portions of a single cycle of cantilever oscillation. Plot 1602 enables estimation of the indentation and Young's modulus using an appropriate elastic-contact mechanics model, such as the Derjaguin-Muller-Toporov (DMT) model or the Johnson-Kendall-Roberts (JKR) model of elastic contact.

Figure 17:
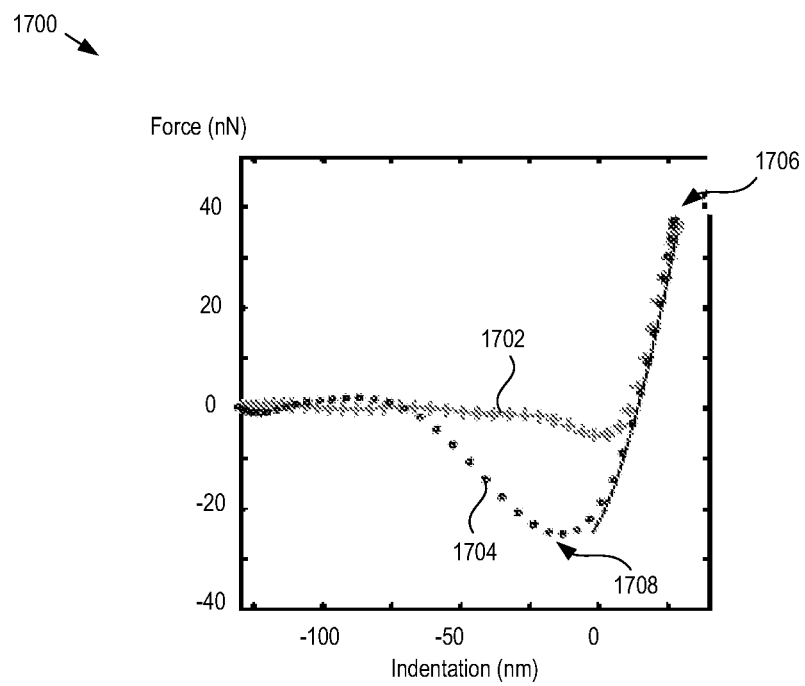
FIG. 17 depicts a plot of estimated force versus indentation in accordance with the illustrative embodiment of the present invention.

FIG. 17 depicts a plot of estimated force versus indentation in accordance with the illustrative embodiment of the present invention. Trace 1702 corresponds to the force exerted on tip 206 during its approach toward surface 118. Trace 1704 corresponds to the force exerted on tip 206 during retraction of tip 206 from surface 118.

Points 1706 and 1708 denote the peak repulsive and adhesive forces, respectively, as experienced by tip 206 during tip-surface interaction.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An atomic-force microscope system for estimating a physical property of a surface, the atomic-force microscope system including a high-bandwidth AFM probe comprising:
   a cantilever body that has a longitudinal axis along a first direction, wherein the cantilever body is characterized by a first resonance frequency that is along a second direction that is substantially orthogonal with the first direction;
   a sensor having a first end and a second end, the sensor and the cantilever body being attached at the first end, wherein the sensor includes a diffraction grating whose quiescent diffraction characteristics change monotonically along the first direction from the first end to the second end, and wherein the sensor is characterized by a second resonance frequency along the second direction that is higher than the first resonance frequency;
   a tip, the tip and the sensor being mechanically coupled at the second end; and
   a light source that provides a first light signal to the sensor, wherein:
   (a) the first light signal is incident on the sensor at a first position under a first set of conditions;
   (b) the first light signal is incident on the sensor at a second position under a second set of conditions, wherein:
      (i) the first and second positions are at different locations along the first direction between the first end and the second end of the sensor;
      (ii) the set of conditions includes a wavelength of the first light signal, an angle of incidence between the first light signal and the sensor when the sensor is in its quiescent state, and a medium that is in contact with the surface; and
      (iii) the first and second set of conditions vary from one another as to at least one condition within the set thereof.

2. The system of claim 1 further comprising:
   an actuator that is mechanically coupled with the high-bandwidth AFM probe, the actuator being operative for imparting an oscillation on the cantilever body;
   a detector operative for receiving a second light signal from the sensor, the second light signal including light of the first light signal that is diffracted by the sensor; and
   a processor, the processor being operative for estimating the physical property based on the second light signal.

3. The system of claim 1 wherein the sensor comprises:
   a first plurality of elements that are substantially flat and coplanar in a first plane, the first direction being within the first plane, wherein each of the first plurality of elements is a cantilever that is attached to the cantilever body at the first end; and
   a second plurality of elements, wherein each of the second plurality of elements is a cantilever that is attached to the cantilever body at the first end, and wherein each of the second plurality of elements has a curvature in the second direction such that it is characterized by a distance from the first plane that changes monotonically from the first end to the second end;

wherein one of the first plurality of elements and the second plurality of elements is mechanically coupled with the tip at the second end; and wherein the other one of the first plurality of elements and the second plurality of elements is not mechanically coupled with the tip at the second end.

4. The system of claim 3 wherein each of the second plurality of elements includes a first layer having a first residual stress and a second layer having a second residual stress that is different than the first residual stress, wherein the first layer and second layer are dimensioned and arranged to induce the curvature.

5. The system of claim 4 wherein the first layer comprises silicon and the second layer comprises silicon nitride.

6. The system of claim 3 wherein each of the first plurality of elements is characterized by the second resonance frequency and each of the second plurality of elements is characterized by the second resonance frequency.

7. The system of claim 3 wherein each of the first plurality of elements is characterized by a third resonance frequency along the first direction and each of the second plurality of elements is characterized by the second resonance frequency, wherein the third resonance frequency is different than the second resonance frequency.

8. The system of claim 1 wherein the sensor further comprises:
(i) a first plurality of elements that extend from the cantilever body along the first direction, wherein each of the first plurality of elements is characterized by the second resonance frequency; and
(ii) a second plurality of elements that extend from the cantilever body along the first direction, the second plurality of elements being connected at the second end, wherein each of the second plurality of elements has a third resonance frequency in the second direction, the third resonance frequency being higher than the first resonance frequency;
wherein the first plurality of elements and second plurality of elements are interleaved to collectively define the diffraction grating, and wherein the quiescent spatial relationship between the first plurality of elements and the second plurality of elements changes monotonically along the first direction.

9. The system of claim 8 wherein the second resonance frequency and third resonance frequency are substantially equal.

10. The system of claim 8 wherein each of the first plurality of elements comprises a first layer that is in physical contact with the element, and wherein the first layer is dimensioned and arranged to collectively induce bending of the element in the second direction.

11. The system of claim 8 wherein each of the second plurality of elements comprises a first layer that is in physical contact with the element, the first layer being dimensioned and arranged to induce bending of the element in the second direction.

12. The system of claim 8, wherein each of the first plurality of elements has a first thickness and each of the second plurality of elements has a second thickness, and wherein the first thickness and the second thickness are unequal.

13. The system of claim 8 further comprising a processor, the processor being operative for computing at least one property of the surface based on signal components at frequencies greater than the first resonance frequency, the signal components arising from a physical interaction between the tip and the surface.

14. An atomic-force microscope system for estimating a physical property of a surface, the atomic-force microscope system including a high-bandwidth AFM probe comprising:
(1) a cantilever body that has a longitudinal axis along a first direction in a first plane;
(2) a sensor having a first end and a second end, wherein the sensor includes:
(i) a first plurality of elements that extend from the cantilever body along a first direction;
(ii) a second plurality of elements that extend from the cantilever body along the first direction, the second plurality of elements being connected at the second end;
wherein the first plurality of elements and second plurality of elements are interleaved to collectively define a diffraction grating; and
wherein, when the sensor is in its quiescent state: (A) the first plurality of elements and second plurality of elements have a first separation along a second direction that is orthogonal to the first direction, the first separation being at a first position along the first direction; and (B) the first plurality of elements and second plurality of elements have a second separation along the second direction, the second separation being at a second position along the first direction; and
(3) a tip, the tip and the sensor being mechanically coupled at the second end;
wherein, when the high-bandwidth AFM probe is in its quiescent state, it is dimensioned and arranged to receive a first light signal at the first position under a first set of conditions and at the second position under a second set of conditions, and wherein the set of conditions includes a wavelength of the first light signal, an angle of incidence between the first light signal and the sensor when the sensor is in its quiescent state, and a medium that is in contact with the surface, and further wherein the first and second set of conditions vary from one another as to at least one condition within the set thereof.

15. The system of claim 14 wherein the cantilever body is characterized by a first resonant frequency, the first plurality of cantilevers is characterized by a second resonant frequency, and the second plurality of cantilevers is characterized by a third resonant frequency, the first, second, and third resonant frequencies being along the second direction, and wherein each of the second resonant frequency and third resonant frequency is greater than the first resonant frequency.

16. The system of claim 15 wherein the second resonance frequency and third resonance frequency are substantially equal.

17. The system of claim 15 further comprising:
(4) a light source that is operative for providing the first light signal to the sensor;
(5) a detector operative for receiving a second light signal from the sensor, the second light signal including light of the first light signal that is diffracted by the sensor; and
(6) a processor, the processor being operative for computing at least one property of the surface based on signal components at frequencies greater than the first resonance frequency, the signal components arising from a physical interaction between the tip and the surface.

18. The system of claim 14 further comprising (4) a light source that is operative for providing the first light signal to the sensor.

19. The system of claim 14 further comprising:
(4) an actuator that is mechanically coupled with the high-bandwidth AFM probe, the actuator being operative for imparting an oscillation on the cantilever body;
(5) a detector operative for receiving a second light signal from the sensor, the second light signal including light of the first light signal that is diffracted by the sensor; and
(6) a processor, the processor being operative for estimating the physical property based on the second light signal.

20. The system of claim 14, wherein each of the first plurality of cantilevers has a first thickness and each of the second plurality of cantilevers has a second thickness, and wherein the first thickness and the second thickness are unequal.

* * * * *